(12) United States Patent
Kameoka

(10) Patent No.: US 10,362,258 B2
(45) Date of Patent: Jul. 23, 2019

(54) INFORMATION PROCESSING TO CONTROL A MOVEMENT OF A FOCUS DISPLAYED ON A DISPLAY SCREEN

(71) Applicant: SONY CORPORATION, Tokyo (JP)

(72) Inventor: Shinpei Kameoka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/573,897

(22) Filed: Dec. 17, 2014

(65) Prior Publication Data

US 2015/0189215 A1     Jul. 2, 2015

(30) Foreign Application Priority Data

Dec. 27, 2013  (JP) .................................. 2013-272940

(51) Int. Cl.
| | | |
|---|---|---|
| *G06F 3/044* | (2006.01) | |
| *H04N 5/44* | (2011.01) | |
| *H04N 21/422* | (2011.01) | |
| *H04N 21/442* | (2011.01) | |
| *G06F 3/0482* | (2013.01) | |
| *G06F 3/0488* | (2013.01) | |
| *G06F 3/0481* | (2013.01) | |

(52) U.S. Cl.
CPC .......... *H04N 5/4403* (2013.01); *G06F 3/0482* (2013.01); *G06F 3/04812* (2013.01); *G06F 3/04883* (2013.01); *H04N 21/42204* (2013.01); *H04N 21/44222* (2013.01); *H04N 2005/443* (2013.01)

(58) Field of Classification Search
CPC ........... H04N 5/4403; H04N 21/42204; H04N 21/44222; G06F 3/0482; G06F 3/04883; G06F 3/04812; G06F 3/038; G06F 3/0484; G06F 3/03547
USPC .......................................................... 345/179
See application file for complete search history.

(56) References Cited

U.S. PATENT DOCUMENTS

| | | | |
|---|---|---|---|
| 2009/0284466 A1* | 11/2009 | Chen .................... | G06F 3/0383 345/157 |
| 2010/0039382 A1* | 2/2010 | Kumagai .............. | G06F 3/0346 345/158 |
| 2012/0229410 A1* | 9/2012 | Ohashi ................ | G06F 3/04883 345/173 |
| 2013/0019173 A1* | 1/2013 | Kotler .................. | G06F 3/0482 715/711 |
| 2013/0036388 A1* | 2/2013 | Kirkpatrick ......... | G06F 3/04883 715/856 |
| 2013/0093686 A1* | 4/2013 | Kalu .................... | G06F 1/1654 345/173 |
| 2013/0155172 A1* | 6/2013 | Mock ................ | H04N 21/42204 348/14.03 |
| 2013/0179813 A1* | 7/2013 | BianRosa ............. | G06F 3/038 715/767 |

FOREIGN PATENT DOCUMENTS

JP     H05-119946 A     5/1993

* cited by examiner

*Primary Examiner* — Towfiq Elahi
(74) *Attorney, Agent, or Firm* — Chip Law Group

(57) ABSTRACT

A control device includes a control unit configured to discretely move a focus on a display screen according to a user's operation. Movement of the focus is limited according to a movement speed of the user's operation.

8 Claims, 12 Drawing Sheets

FIG. 1
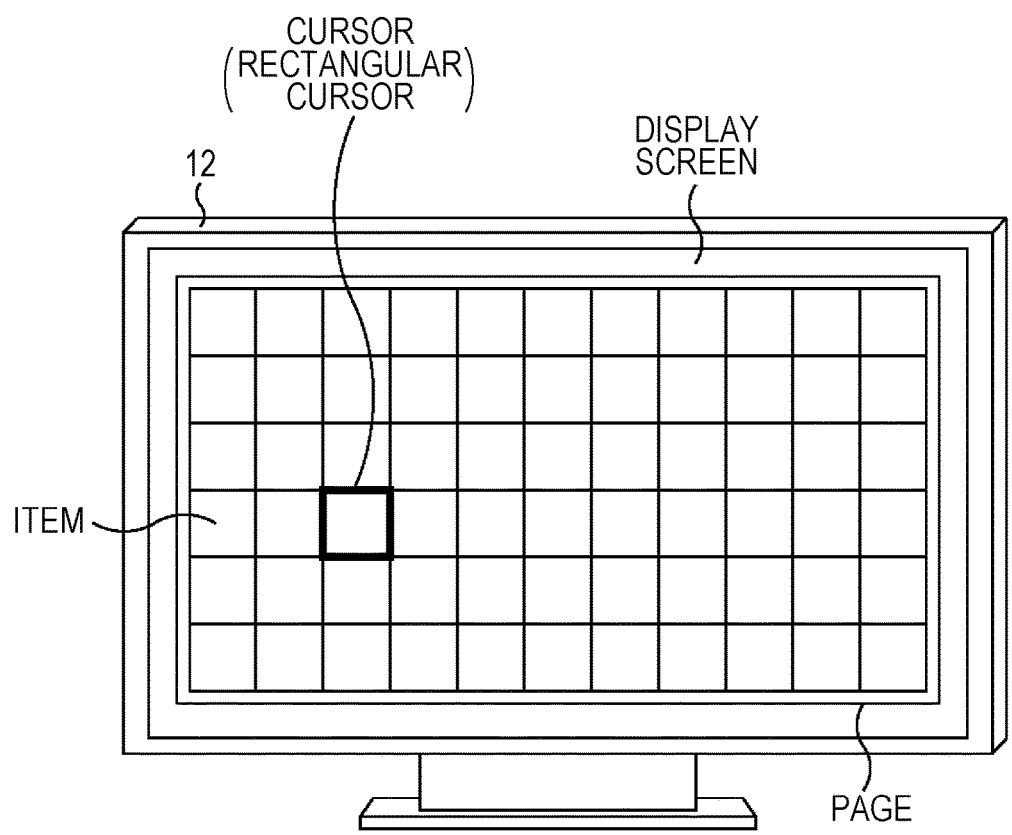
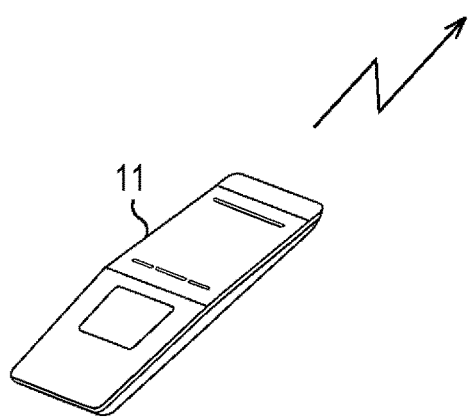

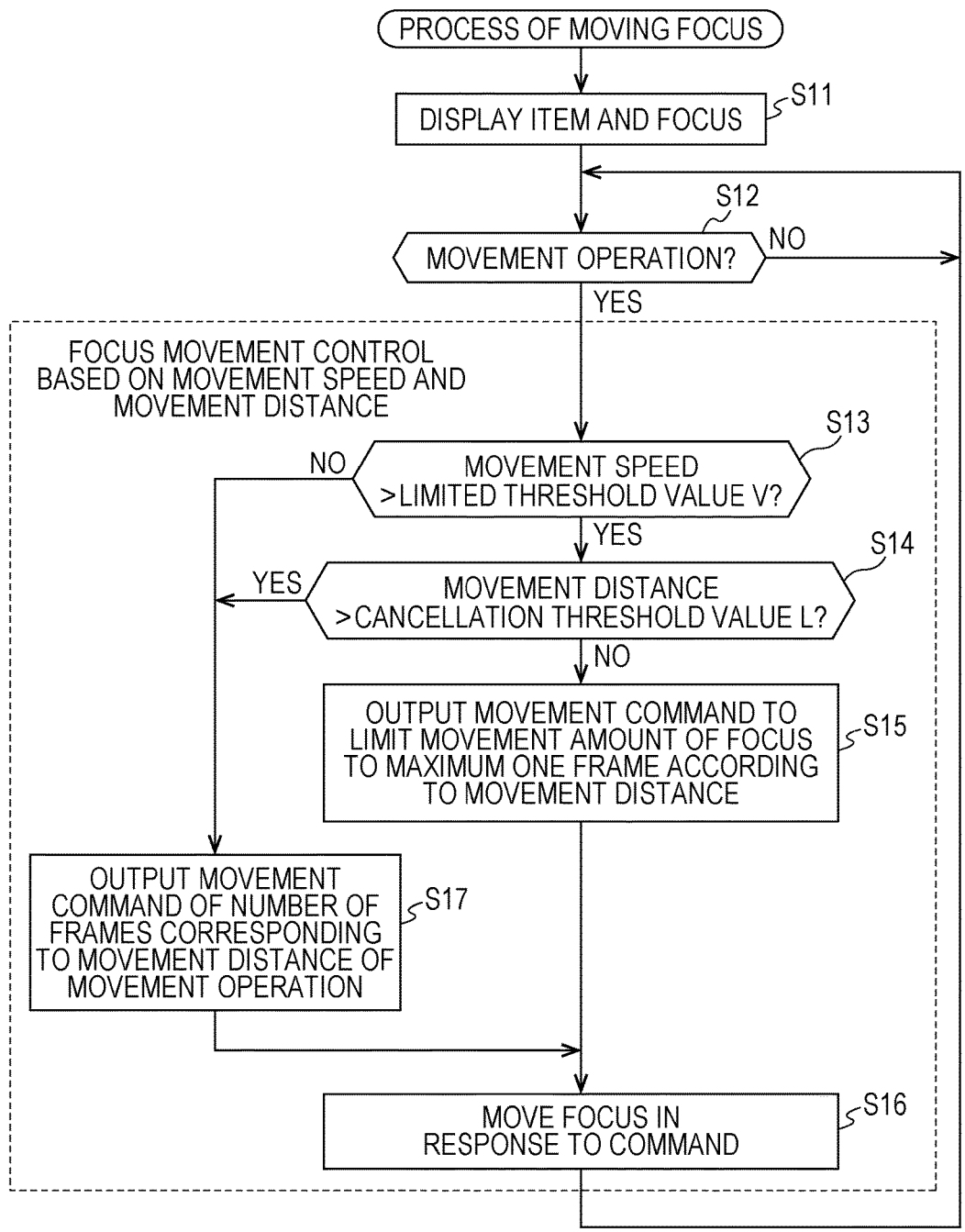

INFORMATION PROCESSING TO CONTROL A MOVEMENT OF A FOCUS DISPLAYED ON A DISPLAY SCREEN

CROSS REFERENCE TO RELATED APPLICATIONS

This application claims the benefit of Japanese Priority Patent Application JP 2013-272940 filed Dec. 27, 2013, the entire contents of which are incorporated herein by reference.

BACKGROUND

The present technology relates to a control device, a control method, and a program, and more particularly, to a control device, a control method, and a program capable of improving operability of a focus moved through an operation of a remote controller or the like on which, for example, a sensor such as a touch pad, a joystick, or a gyro sensor is mounted. For example, as technologies for moving display objects through touch input operations on touch panels, user interfaces on which users perform a series of operations from rough movements to minute movements through only touch operations have been suggested (for example, Japanese Unexamined Patent Application Publication No. 5-119946).

However, when a user moves a focus indicating a cursor or the like on a display screen using a device (hereinafter also referred to as a touch device) including a touch sensor that detects a touch (contact) of the user, such as a touch pad or a touch panel of a remote controller including the touch pad or a terminal including the touch panel, for example, the user performs a swiping operation (swiping gesture) of moving the focus from a certain position to another position on the touch sensor while touching his or her finger or the like in some cases. For example, when a plurality of items such as a plurality of icons are displayed on a display screen along with a cursor serving as a focus discretely moving the position of an item and a user performs a swiping operation, the focus (cursor) discretely moves on the items according to the swiping operation of the user.

Here, movement of the focus corresponding to N items is assumed to be N frame movement. The movement of the focus by the swiping operation is performed according to an operation determination algorithm that determines an operation (user's operation on a touch sensor) of the touch sensor.

According to a general operation determination algorithm, for example, when a movement distance of a swiping operation exceeds a threshold value (hereinafter referred to as a distance threshold value) of a preset distance, a command is issued as instruction information instructing movement of a focus by one frame. According to the command, the focus on the display screen is moved by one frame.

Accordingly, a user can move a focus by one frame or move the focus by two or more frames, i.e., a plurality of frames by performing a swiping operation for a short movement distance or a swiping operation for a long movement distance.

SUMMARY

However, it is difficult for a user to distinguish a swiping operation of moving a focus by one frame from a swiping operation of moving the focus by a plurality of frames. For example, even when the user performs a swiping operation with the intention of movement by one frame (of the focus), movement of a plurality of frames unintended by the user occurs in some cases, and thus operability of the focus may not be improved. It is desirable to provide the present technology for improving operability of a focus.

According to an embodiment of the present technology, there is provided a control device including a control unit configured to discretely move a focus on a display screen according to a user's operation. Movement of the focus is limited according to a movement speed of the user's operation. There is also provided a program causing a computer to function as the control device.

According to another embodiment of the present technology, there is provided a control method including discretely moving a focus on a display screen according to a user's operation. Movement of the focus is limited according to a movement speed of the user's operation.

According to the embodiments of the present technology, the focus on the display screen discretely moves according to a user's operation. The movement of the focus is limited according to the movement speed of the user's operation. The control device may be an independent device or an internal block included in one device. The program can be recorded on a recording medium and supplied by being transmitted via a transmission medium.

According to an embodiment of the present technology, it is possible to improve the operability of a focus. The advantages described herein are not necessarily limited, but any advantage described in an embodiment of the present disclosure may be obtained.

BRIEF DESCRIPTION OF THE DRAWINGS

FIG. 1 is a perspective view illustrating an example of the configuration of a TV system of an embodiment to which the present technology is applied;

FIG. 8 is a flowchart for describing an example of a process of moving the cursor serving as the focus;

DETAILED DESCRIPTION OF EMBODIMENTS

Embodiment of TV System to which the Present Technology is Applied

FIG. 1 is a perspective view illustrating an example of the configuration of a TV system of an embodiment to which the present technology is applied.

In FIG. 1, the TV system includes a remote controller 11 and a TV 12.

The remote controller 11 is operated by a user and transmits an operation signal corresponding to the user's operation.

Here, the operation signal transmitted by the remote controller 11 may be transmitted according to any of wired and wireless communication methods.

When the operation signal is transmitted wirelessly by the remote controller 11, for example, an infrared communication method, a wireless local area network (LAN), a Bluetooth (registered trademark), or any other communication method can be used as the wireless communication method.

The TV 12 receives content of television broadcast, content reproduced by an external device, content transmitted via a network such as the Internet, or the like, displays images of the content on a display screen, and outputs audio. The TV 12 can also activate, for example, a browser and display web pages (images of the pages) on the Internet on the display screen. The TV 12 displays a focus or an item serving as a graphical user interface (GUI) in addition to an icon of a focus target (corresponding to the focus) on the display screen, as necessary. Here, examples of the item displayed by the TV 12 include a setting screen for performing various kinds of setting in addition to a menu screen, an icon serving as a symbol of content, and a GUI for changing a volume or a channel. When there are a plurality of items as the item displayed by the TV 12, the plurality of items can be divided into a plurality of pages and the item can be displayed for each page in the TV 12.

In the embodiment, the display of a focus can be realized as display in which a user can recognize that an item is focused, such as display in which the luminance, color, shape (including a size), or the like of the item is changed or display in which the item is vibrated, in addition to display in which a cursor with a rectangular shape (the rim of the rectangular shape) is shown.

The TV 12 receives operation signals transmitted from the remote controller 11 and performs various processes according to the operation signals. That is, for example, the TV 12 changes a selected channel or a volume according to an operation signal from the remote controller 11.For example, the TV 12 moves a focus displayed by a cursor or the like according to the operation signal from the remote controller 11.

In FIG. 1, the focus is displayed by a rectangular cursor (rectangular cursor) and the rectangular cursor serving as the focus discretely moves the position of an item according to an operation, for example, when the user operates the remote controller 11.

Example of Outer Appearance Configuration of Remote Controller 11

Figure 2:
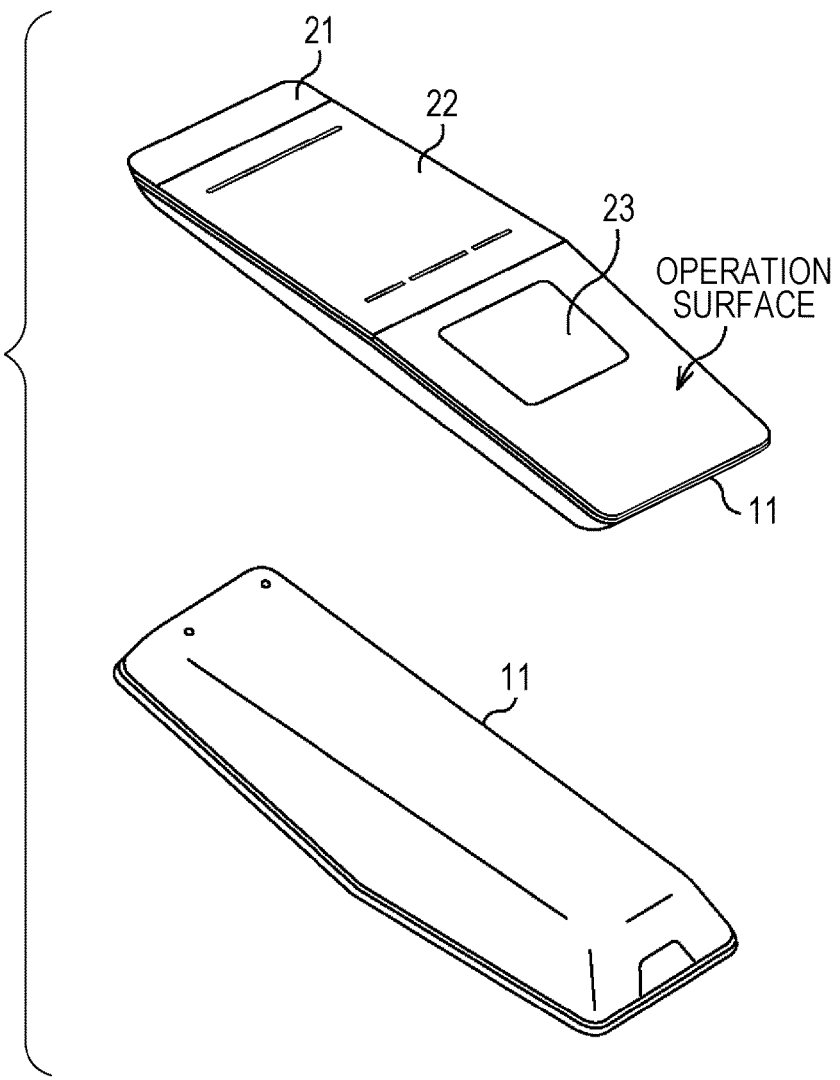
FIG. 2 is a perspective view illustrating an example of the outer appearance configuration of a remote controller.

FIG. 2 is a perspective view illustrating an example of the outer appearance configuration of the remote controller 11 in FIG. 1.

The remote controller 11 has a substantially flat rectangular parallelepiped shape.

A hard key portion 21, a touch pad 22, and a hard key portion 23 operated by the user are installed on one surface of the flat plate which is the remote controller 11.

Here, the one surface of the remote controller 11 on which the hard key portion 21, the touch pad 22, and the hard key portion 23 operated by the user are installed is also referred to as an operation surface below.

FIG. 2 illustrates the remote controller 11 in the state in which the operation surface faces the upper side and the state in which the operation surface faces the lower side.

Figure 3:
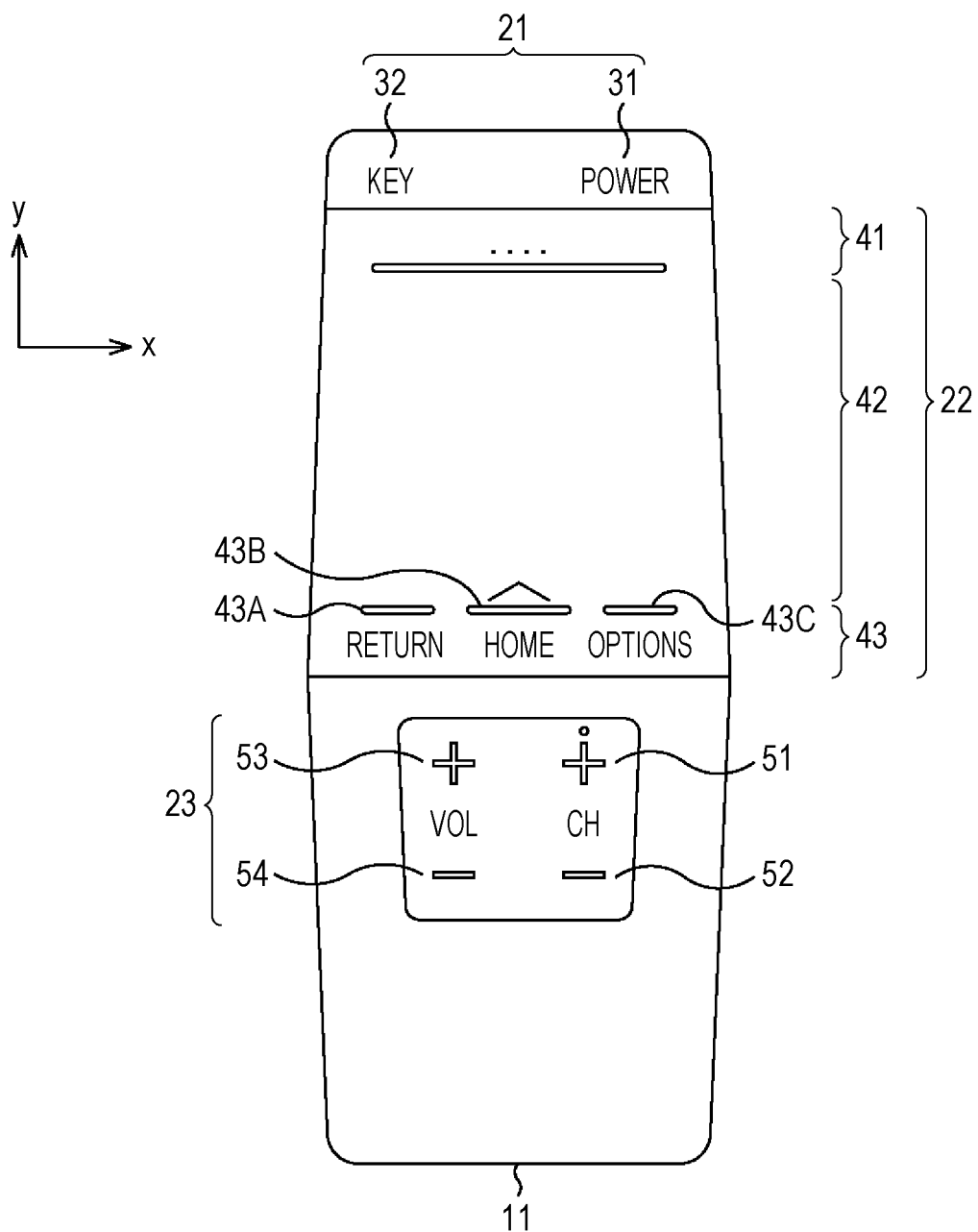
FIG. 3 is a plan view illustrating an example of the configuration of an operation surface of the remote controller.

FIG. 3 is a plan view illustrating an example of the configuration of an operation surface of the remote controller 11.

Hard keys 31 and 32 are installed in the hard key portion 21.

The hard key 31 is a power key. When the hard key 31 is operated, the TV 12 is turned on or off.

The hard key 32 is a special key. When the hard key 32 is operated, the TV 12 performs a predetermined process.

The touch pad 22 is operated when a cursor displayed on the TV 12 is moved and is operated in other various cases.

In FIG. 3, the touch pad 22 has a substantially trapezoidal shape and is divided into an area 41 (of the upper portion) on the upper base side of the trapezoidal shape, an area 43 (of the lower portion) on the lower base side of the trapezoidal shape, and an area 42 of the middle portion interposed between the areas 41 and 43. When the area 41 is subjected to a swiping operation from the right side to the left side of the horizontal direction (x direction), the TV 12 changes a selected channel, for example, so that its channel number increases from a current channel number.

The touch pad 22 is configured so that a pushing operation is enabled. When the area 41 is subjected to the pushing operation (when the touch pad 22 is subjected to the pushing operation in the state in which the area 41 is touched), for example, the TV 12 displays a remote controller (an image of the remote controller) on a display screen to control the TV 12.

The area 42 is subjected to the swiping operation, for example, when a focus displayed by a cursor or the like on the display screen of the TV 12 is moved. That is, when the area 42 is subjected to the swiping operation, for example, the cursor serving as the focus on the display screen of the TV 12 moves according to the swiping operation on the area 42. When the area 42 is subjected to a pushing operation (when the touch pad 22 is subjected to the pushing operation in the state in which the area 42 is touched), for example, the TV 12 performs the same process as a process when a so-called decision key is operated.

When the area 42 is subjected to a flicking operation, for example, the TV 12 performs the same process as a process when a so-called cursor key is operated.

The area 43 is divided into three areas 43A, 43B, and 43C in the horizontal direction. When the area 43A is subjected to a pushing operation, for example, the TV 12 performs the same process (a process of returning to the immediately previous state) as a process when a so-called return key is operated. When the area 43B is subjected to a pushing operation, for example, the TV 12 performs the same process (a process of display a home screen) as a process when a so-called home key is operated. Further, when the area 43B is subjected to a swiping operation upward in the vertical direction (y direction), for example, the TV 12 displays a program selection screen used to select a program on the display screen. When the area 43C is subjected to a pushing operation, for example, the TV 12 performs the same process (for example, a process of displaying an option menu) as a process when a so-called option key is operated.

Hard keys 51, 52, 53, and 54 are installed in the hard key portion 23.

The hard key 51 is operated, for example, when a selected channel of the TV 12 increases. The hard key 52 is operated, for example, when a selected channel of the TV 12 decreases.

The hard key 53 is operated, for example, when the volume of the TV 12 increases. The hard key 54 is operated, for example, when the volume of the TV 12 decreases.

Examples of Electric Configurations of Remote Controller 11 and TV 12

Figure 4:
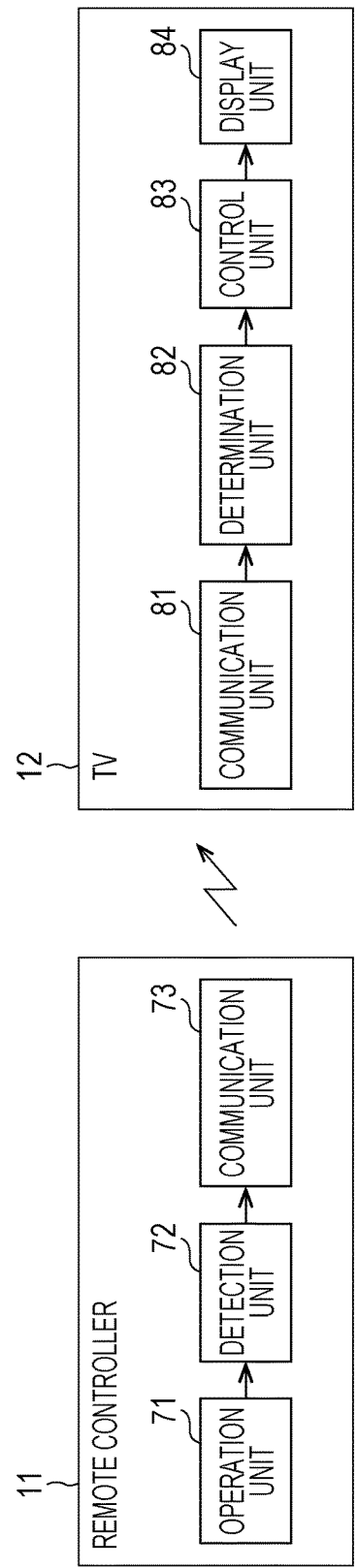
FIG. 4 is a block diagram illustrating examples of electric configurations of the remote controller and the TV.

FIG. 4 is a block diagram illustrating examples of electric configurations of the remote controller 11 and the TV 12 in FIG. 1. The remote controller 11 includes an operation unit 71, a detection unit 72, and a communication unit 73. The operation unit 71 corresponds to the hard key portion 21, the touch pad 22, and the hard key portion 23 (FIG. 2) and is operated by the user. The detection unit 72 detects an operation of the operation unit 71 by the user and supplies an operation signal corresponding to the operation to the communication unit 73.

For example, the communication unit 73 wirelessly transmits the operation signal from the detection unit 72.

The TV 12 includes a communication unit 81, a determination unit 82, a control unit 83, and a display unit 84. The communication unit 81 receives the operation signal transmitted from the remote controller 11 (the communication unit 73 of the remote controller 11) and supplies the operation signal to the determination unit 82. The determination unit 82 determines an operation of the remote controller 11 by the user based on the operation signal from the communication unit 81. Further, the determination unit 82 supplies (outputs) a command serving as instruction information instructing movement of the focus, confirmation of selection of a focused item, or the like to the control unit 83 based on a determination result of the operation of the remote controller 11.

The control unit 83 controls the entire TV 12 according to the command from the determination unit 82 That is, the control unit 83 performs, for example, control of a channel, a volume, or the like according to the command from the determination unit 82 The control unit 83 controls, for example, display of a cursor or an item serving as a focus on the display unit 84 according to the command from the determination unit 82. The display unit 84 includes, for example, a liquid crystal display (LCD) or an organic electro-luminescence (EL) display and displays an image of content, an item, and a cursor serving as the focus on the display screen under the control of the control unit 83.

Movement of Focus

Figure 5A:
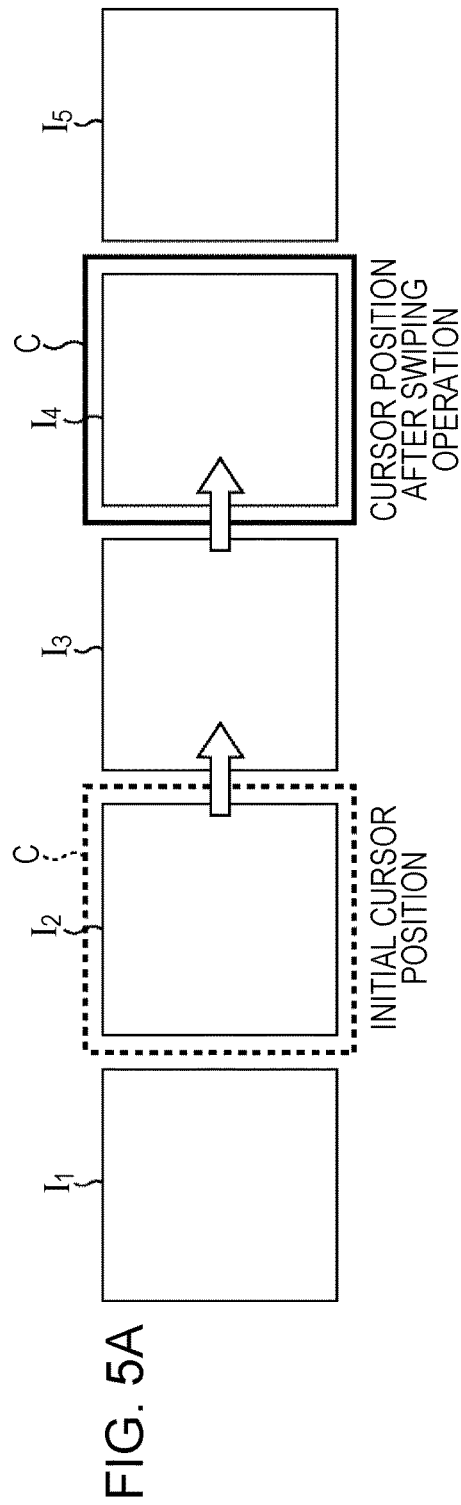
FIGS. 5A and 5B are diagrams for describing an example of movement of a cursor serving as a focus discretely moving on items.
Figure 5B:
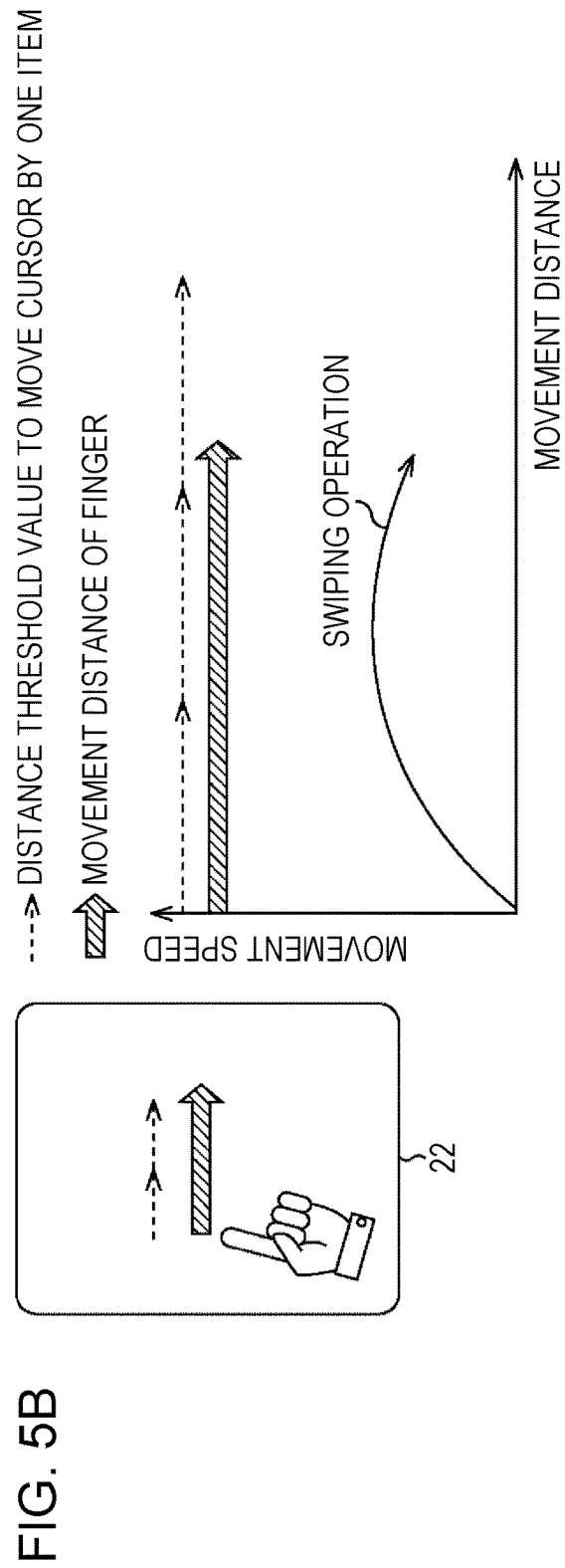

FIGS. 5A and 5B are diagrams for describing an example of movement of a cursor C serving as a focus discretely moving on items.

FIG. 5A illustrates the (rectangular) cursor C discretely moving on items.

In FIG. 5A, five items $I_1$, $I_2$, $I_3$, $I_4$, and $I_5$ are arranged in the horizontal direction. The cursor C discretely moves on the items $I_n$ (where n=1, 2, 3, 4, and 5) according to an operation of the remote controller 11.

FIG. 5B illustrates an operation of moving the cursor C on the touch pad 22. When the cursor C is moved to the right, the user performs a swiping operation from the left to the right on the touch pad 22 of the remote controller 11 using his or her finger or the like. Here, in FIG. 5B, an arrow indicated by diagonal lines indicates a movement distance of the swiping operation of one time. The swiping operation of one time means a swiping operation which is performed without a change in a movement direction (a predetermined angle or more) and without cancellation of the touch after the touch pad 22 is touched. In FIG. 5B, a dotted arrow indicates a distance threshold value.

The determination unit 82 determines a movement distance and a movement direction of a swiping operation and supplies a movement command (event) to move the cursor C in the movement direction of the swiping operation by the same number of frames as a number of times the movement distance exceeds the distance threshold value to the control unit 83.

In FIG. 5B, the movement distance of the swiping operation to the right exceeds the distance threshold value twice. Therefore, a movement command to move the cursor C to the right by 2 frames is supplied from the determination unit 82 to the control unit 83. The control unit 83 moves the cursor C to the right by two frames according to the movement command from the determination unit 82.

Accordingly, as indicated by a dotted line in FIG. 5A, when the cursor C is located at the item $I_2$ immediately before the swiping operation and the swiping operation illustrated in FIG. 5B is performed, the cursor C is moved to the right by two frames to be located at the item $I_4$.

However, the user tends to perform a flicking operation of sweeping his or her finger rapidly with the intention of moving the cursor C serving as the focus by one frame when the user performs the swiping operation. In the flicking operation (the swiping operation like the flicking operation), the user moves his or her finger rapidly.

Therefore, it is difficult to adjust the movement distance and the movement distance may be longer than a movement distance intended by the user. Thus, as illustrated in FIGS. 5A and 5B, the cursor C is moved by a plurality of frames such as two frames in some cases.

As described above, the user intends to move the cursor C by one frame, but the cursor C may be moved by a plurality of frames since the user performs the swiping operation like the flicking operation by moving his or her finger rapidly. For this reason, operability may not be improved.

As described above, as a method of preventing movement of a plurality of frames unintended by the user, there is a method of increasing the distance threshold value. However, when the distance threshold value increases, it is necessary to perform a swiping operation of a long movement distance for movement of one frame. Further, it is necessary to perform a swiping operation of a longer movement distance for movement of a plurality of frames, and thus operability deteriorates.

On the other hand, when the distance threshold value decreases, movement of a plurality of frames can be performed through a swiping operation of a short movement distance. However, it is necessary to perform a sensitive swiping operation for movement of one frame, and thus operability also deteriorates.

Accordingly, in the TV 12, the movement of the cursor C serving as the focus is limited according to a movement speed of a swiping operation by the user.

Limit of Movement of Focus According to Movement Speed

Figure 6A:
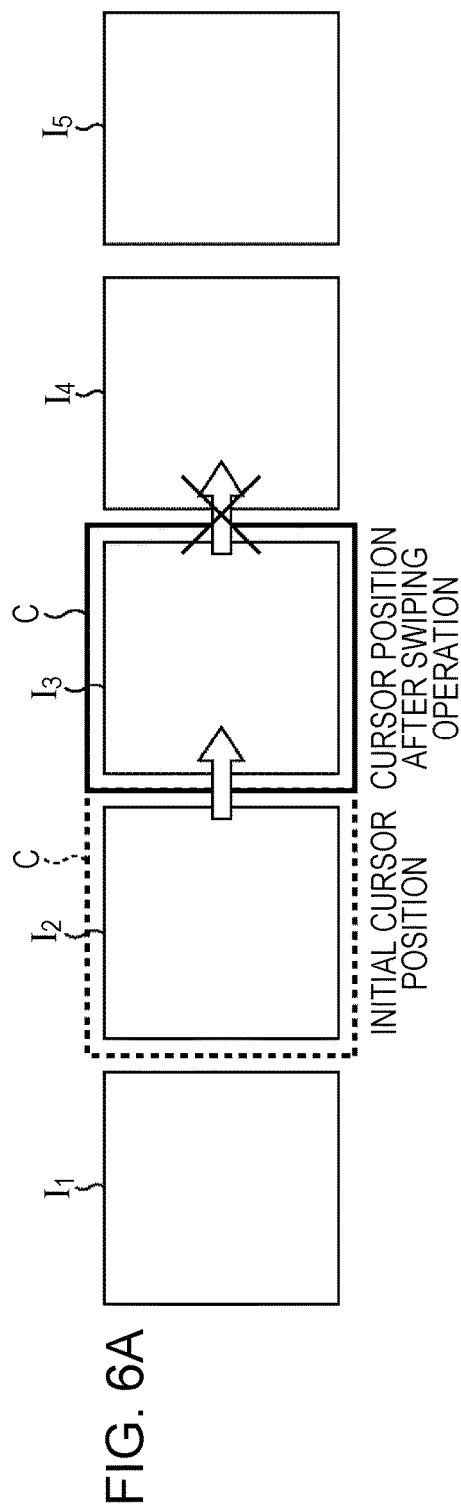
FIGS. 6A and 6B are diagrams for describing an example of limit of movement of the cursor serving as the focus discretely moving on the items.
Figure 6B:
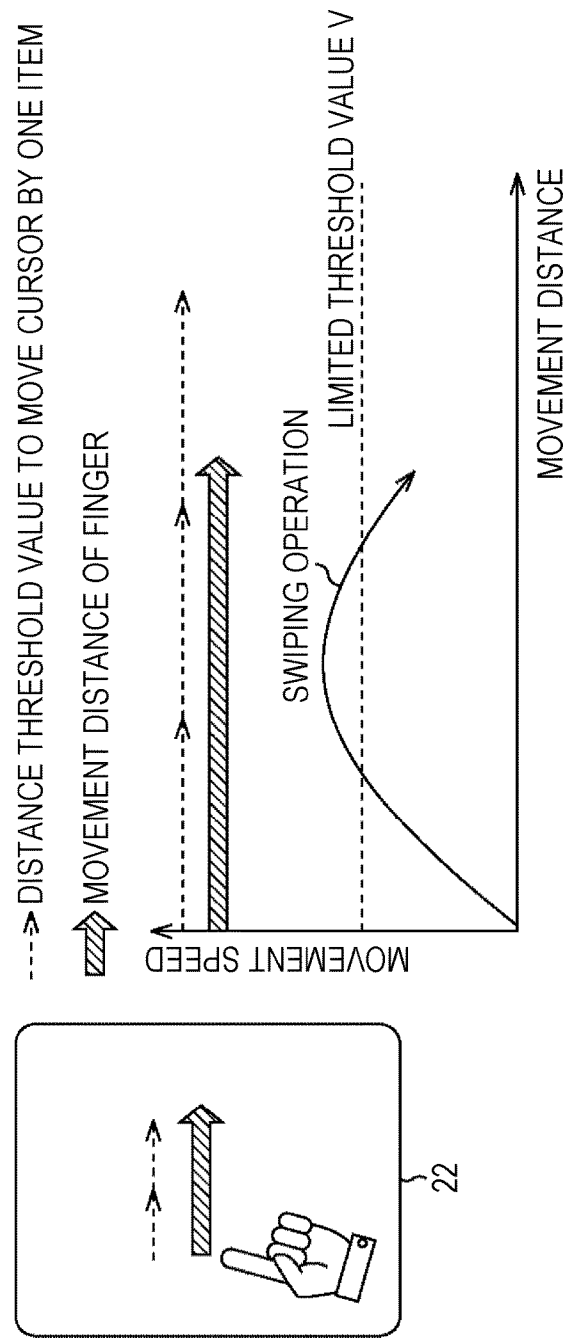

FIGS. 6A and 6B are diagrams for describing an example of limit of movement of the cursor C serving as the focus discretely moving on the items.

FIG. 6A illustrates the cursor C discretely moving on the items. In FIG. 6A, as in the case of FIG. 5A, the five items $I_1$ to $I_5$ are arranged in the horizontal direction and the cursor C discretely moves on the items $I_n$ according to an operation of the remote controller 11.

FIG. 6B illustrates an operation of moving the cursor C on the touch pad 22.

In FIG. 6B, as in the case of FIG. 5B, an arrow indicated by diagonal lines indicates a movement distance of the swiping operation of one time and a dotted arrow indicates a distance threshold value.

In FIG. 6B, as in the case of FIG. 5B, a swiping operation is performed to the right so that movement distance exceeds the distance threshold value twice.

In FIG. 6B, however, a limit threshold value V which is a threshold value of the movement speed of the swiping operation is set to limit the movement of the cursor C serving as the focus. Thus, when the movement speed exceeds the limit threshold value V, the determination unit 82 limits the movement of the cursor C serving as the focus to, for example, movement of one frame in spite of the fact that the movement distance exceeds a distance threshold value corresponding to several times more than once.

In FIG. 6B, the swiping operation is performed to the right so that movement distance exceeds the distance threshold value twice. However, since the movement speed exceeds the limit threshold value V, the determination unit 82 limits the movement of the cursor C to the movement of one frame and supplies a movement command to move the cursor C to the right by one frame to the control unit 83. The control unit 83 moves the cursor C to the right by one frame according to the movement command from the determination unit 82.

Accordingly, in a case in which the cursor C immediately before the swiping operation is located at the item $I_2$ as indicated by a dotted line in FIG. 6A, when the swiping operation illustrated in FIG. 6B is performed to the right so that the movement speed exceeds the limit threshold value V, the cursor C does not move to the right by one frame in spite of the fact that the movement distance of the swiping operation exceeds the distance threshold value corresponding to a plurality of times (in spite of the fact that the swiping operation is an operation of moving the cursor C by a plurality of frames). That is, the cursor C moves by one frame from the item (currently focused item) $I_2$ located at the current position to the item $I_3$ adjacent to the right.

As described above, when the movement speed exceeds the limit threshold value V, the movement of the cursor C is limited to the movement of one frame.

Accordingly, even when the user performs a swiping operation like a flicking operation of moving his or her finger rapidly with the intention of moving the cursor C by one frame, so that the movement distance of the swiping operation becomes consequently longer, the cursor C moves by one frame according to the user's intention. Thus, it is possible to improve the operability of the cursor C serving as the focus. However, when the cursor C serving as the focus moves by a plurality of frames, the user performs a swiping operation of a long movement distance. For example, when the user performs a swiping operation of considerably sweeping his or her finger as the swiping operation of a long movement distance, the movement speed exceeds the limit threshold value V in some cases. In the case in which the movement speed exceeds the limit threshold value V, the movement of the cursor C is limited to the movement of one frame when the movement of the cursor C serving as the focus is limited according to the movement speed.

Accordingly, in the case in which the user performs a swiping operation of sweeping his or her finger considerably, the cursor C moves by one frame when the movement of the cursor C serving as the focus is limited according to the movement speed. Thereafter, even when the user continuously performs the swiping operation, the cursor C does not move in some cases.

However, when the cursor C does not move in spite of the fact that the user continuously performs the swiping operation with the intention of moving the cursor C by a plurality of frames, the operability may not be improved.

Accordingly, in the TV 12, the limit of the movement of the cursor C serving as the focus is cancelled according to a movement distance of the swiping operation by the user.

Cancellation of Limit of Movement of Focus According to Movement Distance

Figure 7A:
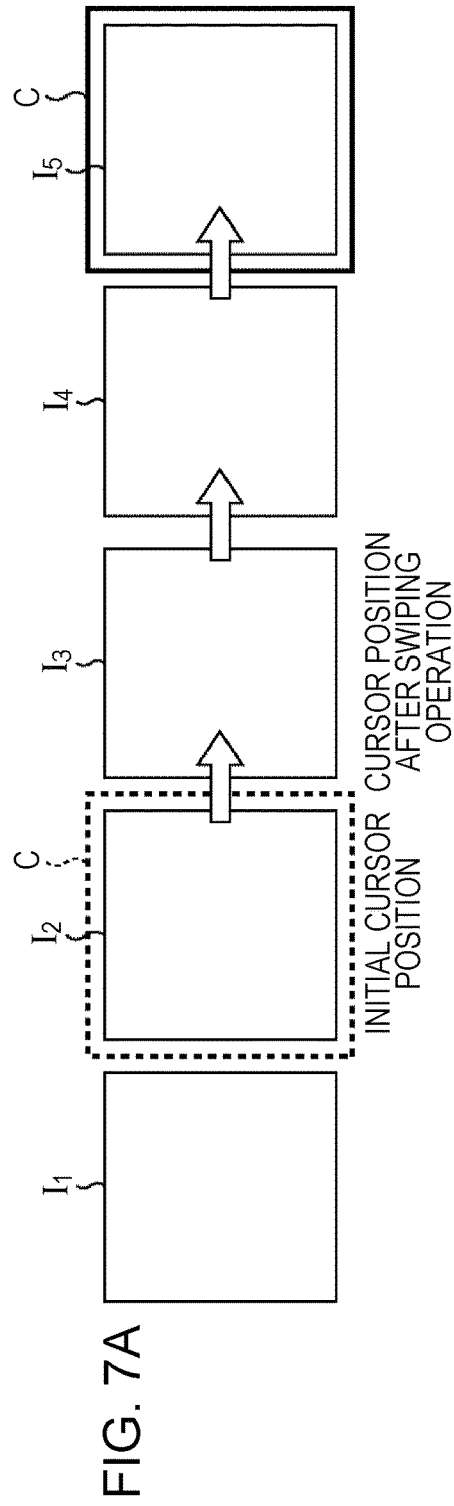
FIGS. 7A and 7B are diagrams for describing an example of cancellation of the limit of the movement of the cursor serving as the focus discretely moving on the items.
Figure 7B:
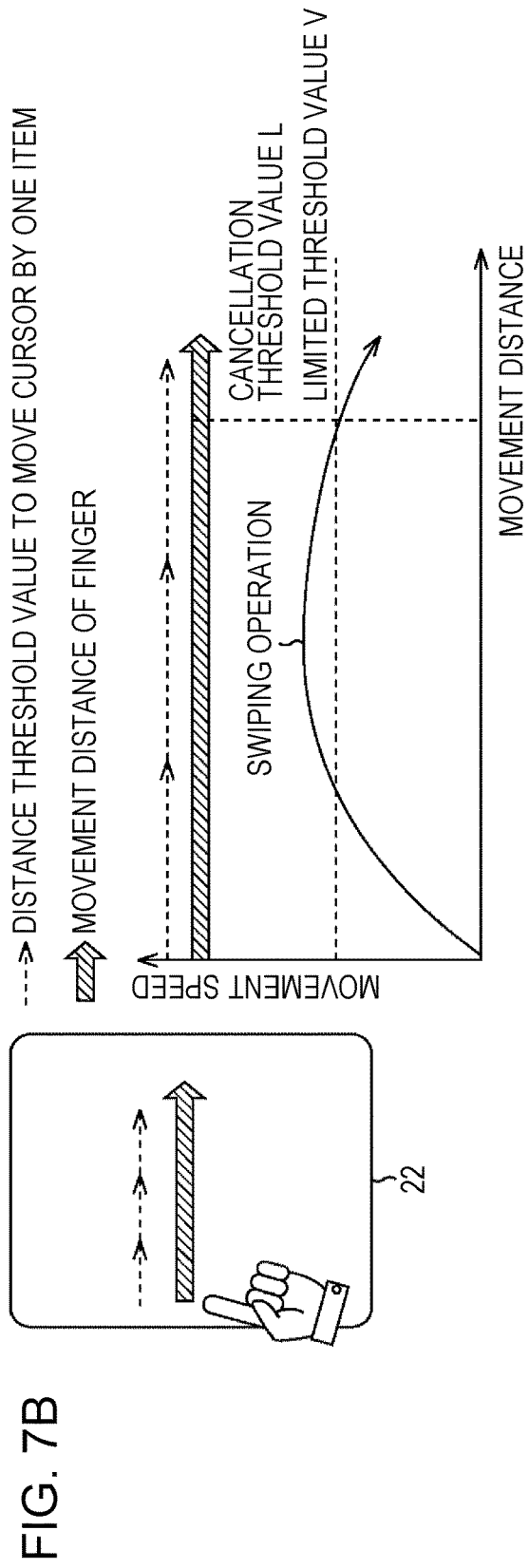

FIGS. 7A and 7B are diagrams for describing an example of cancellation of the limit of the movement of the cursor C serving as the focus discretely moving on the items.

FIG. 7A illustrates the cursor C discretely moving on the items.

In FIG. 7A, as in the case of FIG. 5A, the five items $I_1$ to $I_5$ are arranged in the horizontal direction and the cursor C discretely moves on the items $I_n$ according to an operation of the remote controller 11.

FIG. 7B illustrates an operation of moving the cursor C on the touch pad 22.

In FIG. 7B, as in the case of FIG. 5B, an arrow indicated by diagonal lines indicates a movement distance of the swiping operation of one time and a dotted arrow indicates a distance threshold value.

In FIG. 7B, a swiping operation is performed to the right so that movement distance exceeds the distance threshold value three times.

Here, in FIG. 7B, as in FIG. 6B, the limit threshold value V is set. When a movement speed exceeds the limit threshold value V, the determination unit 82 limits the movement of the cursor C serving as the focus to movement of one frame.

In FIG. 7B, a cancellation threshold value L which is a threshold value of the movement distance of the swiping operation is set to cancel the limit of the movement of the cursor C according to the movement speed of the swiping operation. Thus, when the movement speed exceeds the limit threshold value V, the determination unit 82 limits the movement of the cursor C to the movement of one frame.

However, when the movement distance exceeds the cancellation threshold value L, the determination unit 82 cancels the limit of the movement of the cursor C in spite of the fact that the movement speed exceeds the limit threshold value V.

In FIG. 7B, as described above, the swiping operation is performed to the right so that the movement distance exceeds the distance threshold value three times. Further, in FIG. 7B, since the movement speed exceeds the limit threshold value V, the determination unit 82 limits the movement of the cursor C. However, when the movement distance exceeds the cancellation threshold value L, the determination unit 82 cancels the limit of the movement of the cursor C.

As described above, as a result of the cancellation of the limit of the movement of the cursor C, the determination unit 82 supplies a movement command to move the cursor C to the right by three frames in response to the swiping operation performed to the right so that movement distance exceeds the distance threshold value three times (outputs a movement command to move the cursor C by one frame three times), to the control unit 83. The control unit 83 moves the cursor C to the right by three frames according to the movement command from the determination unit 82.

Accordingly, in a case in which the cursor C immediately before the swiping operation is located at the item $I_2$ as indicated by a dotted line in FIG. 7A, when the movement speed exceeds the limit threshold value V, the movement distance exceeds the cancellation threshold value L, and the swiping operation is performed to the right so that the movement distance exceeds the distance threshold value three times, as illustrated in FIG. 7B, the movement of the cursor C is not limited and the cursor C moves to the right by three frames which are the same as the number of times the movement distance exceeds the distance threshold value. That is, the cursor C moves by three frames from the item (currently focused item) $I_2$ located at the current position to the item $I_5$ distant to the right by three frames.

As described above, when the movement distance exceeds the cancellation threshold value L, the movement of the cursor C is limited.

Accordingly, even when the user performs a swiping operation of considerably sweeping his or her finger rapidly with the intention of moving the cursor C by a plurality of frames, the cursor C is prevented from moving by only one frame due to the limit of the movement of the cursor C. Thus, it is possible to improve the operability of the cursor C serving as the focus. That is, when the movement speed exceeds the limit threshold value V, the movement of the cursor C is limited. When the movement distance exceeds the cancellation threshold value L, the limit of the movement of the cursor C is cancelled. Thus, the cursor C is moved according to the intention of the user even when the user performs a swiping operation (an operation of minutely moving the focus) like a flicking operation of moving his or her finger rapidly with the intention of moving the cursor C by one frame and the user performs a swiping operation (an operation of considerably moving the focus) of considerably sweeping his or her finger rapidly with the intention of moving the cursor C by a many number of frames. Therefore, it is possible to reduce an erroneous operation of the cursor C.

Process of Moving Focus

FIG. 8 is a flowchart for describing an example of a process of moving the cursor C serving as the focus in the TV 12 of FIG. 4.

In step S11, the control unit 83 displays items and the cursor C serving as the focus discretely moving on the items on the display screen of the display unit 84. Then, the process proceeds to step S12.

In step S12, based on an operation signal supplied from the remote controller 11 via the communication unit 81, the determination unit 82 determines whether the user performs a swiping operation as a movement operation of moving the cursor C serving as the focus. When it is determined in step S12 that the user does not perform the swiping operation, the process returns to step S12.

Conversely, when it is determined in step S12 that the user performs the swiping operation, the process proceeds to step S13. Thereafter, the movement of the focus is controlled based on a movement speed of the swiping operation and a movement distance in steps S13 to S17.

That is, in step S13, the determination unit 82 determines whether the movement speed of the swiping operation is greater than the limit threshold value V. When it is determined in step S13 that the movement speed of the swiping operation is greater than the limit threshold value V, the process proceeds to step S14. The determination unit 82 determines whether the movement distance of the swiping operation is greater than the cancellation threshold value L.

When it is determined in step S14 that the movement distance is not greater than the cancellation threshold value L, the process proceeds to step S15. The determination unit 82 outputs a movement command to limit the maximum movement amount of the cursor C serving as the focus to one frame according to the movement distance of the swiping operation. The process proceeds to step S16. That is, when the movement distance exceeds the distance threshold value (once or more times), the determination unit 82 outputs a movement command to move the focus by one frame in the movement direction of the swiping operation. Conversely, when the movement distance is equal to or less than the distance threshold value, the determination unit 82 does not output the movement command (outputs a movement command to move the focus by 0 frame).

In step S16, the control unit 83 moves the cursor C serving as the focus according to the movement command output by the determination unit 82. The process returns to step S12.

As described above, when the movement speed exceeds the limit threshold value V, but the movement distance does not exceed the cancellation threshold value L, the maximum movement of the cursor C serving as the focus is limited to the movement of one frame.

Conversely, when it is determined in step S13 that the movement speed is not greater than the limit threshold value V, the process proceeds to step S17. The determination unit 82 outputs a movement command to instruct movement of the number of frames corresponding to the movement distance (the number of frames which is the same as the number of times the movement distance exceeds the distance threshold value) according to the movement distance of the swiping operation. The process proceeds to step S16.

In step S16, the control unit 83 moves the cursor C serving as the focus according to the command output by the determination unit 82. The process returns to step S12.

As described above, when the movement speed does not exceed the limit threshold value V, the cursor C serving as the focus moves by the number of frames corresponding to the movement distance particularly without limitation of the movement.

Conversely, when it is determined in step S14 that the movement distance is greater than the cancellation threshold value L, the process proceeds to step S17.

Thereafter, the same process as the above-described process is performed. That is, when the movement speed exceeds the limit threshold value V, but the movement distance exceeds the cancellation threshold value L, the cursor C serving as the focus moves by the number of frames corresponding to the movement distance particularly without the limit of the movement, as in the case in which the movement speed does not exceed the limit threshold value V.

As described above, when the movement speed does not exceed the limit threshold value V or when the movement speed exceeds the limit threshold value V but the movement distance exceeds the cancellation threshold value L, the movement of the focus is not limited. When the movement speed exceeds the limit threshold value V, the movement of the focus is limited to the movement of one frame. Thus, the user can easily move the focus by one frame or move the focus by a plurality of frames.

Limit of Movement of Focus According to Operation Target Item

FIGS. 9A, 9B, 10A, and 10B are diagrams for describing an example of limit of movement of a focus according to an operation target item (an item to be subjected to an operation).

In the above-described case, the movement of the focus has been limited according to the movement speed of the swiping operation and the limit of the movement of the focus has been cancelled according to the movement distance of the swiping operation. However, the movement of the focus can be limited according to an operation target item of a swiping operation rather than the movement speed or the movement distance. In this case, it is possible to improve operability of a swiping operation.

Figure 9A:
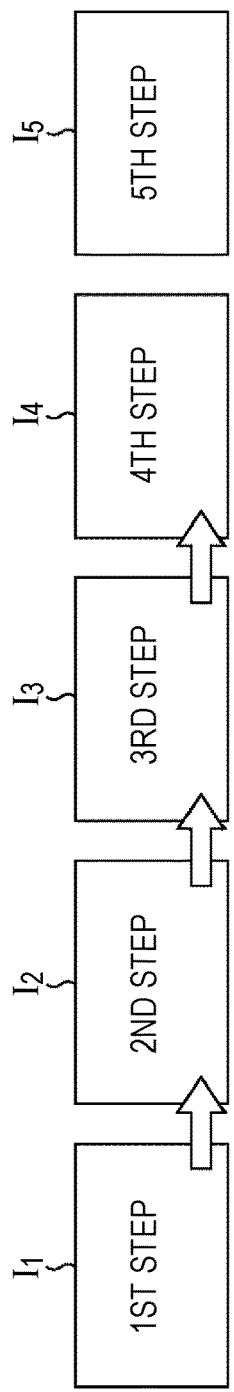
FIGS. 9A and 9B are diagrams for describing an example of limit of movement of a focus according to an operation target item.
Figure 9B:
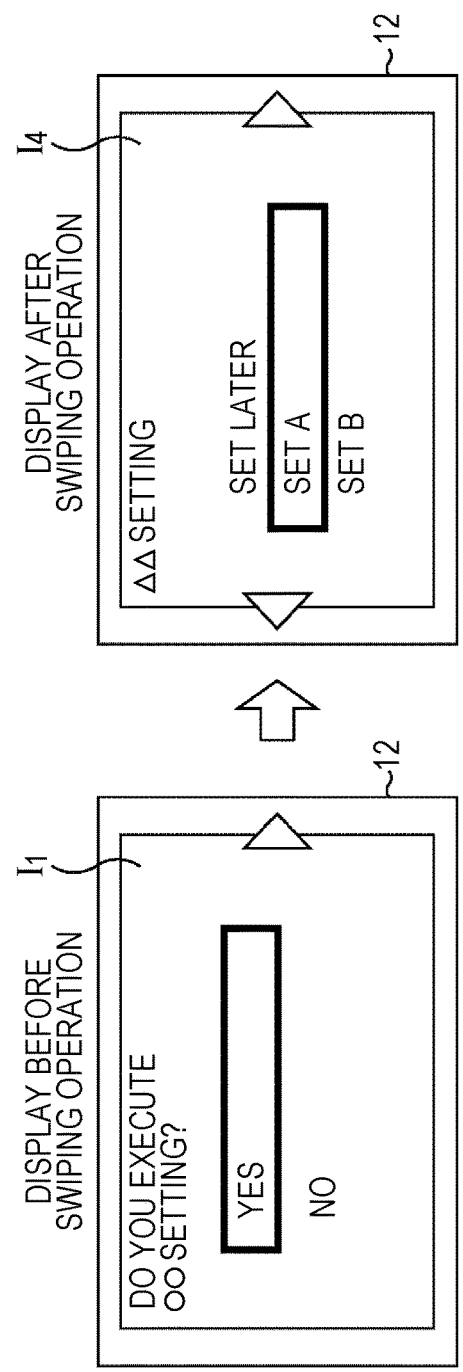

That is, FIGS. 9A and 9B illustrate movement (screen transition) of the focus when an operation target item is a setting screen of a setting application that sets a device such as the TV 12.

FIG. 9A illustrates the setting screen of the setting application as the item. For example, the setting application performs necessary setting by displaying a plurality of setting screens in a wizard mode. In FIG. 9A, the setting application performs necessary setting by displaying setting screens of five pages as items $I_1$ to $I_5$.

Here, the setting screen of an n-th page which is an item $I_n$ is a setting screen for setting an n-th step. In FIG. 9A, the setting of the setting application is divided into five steps. The setting application first puts a focus on the first setting screen (a GUI (item) included in the setting screen) of the first step (first page) which is the item $I_1$ and displays the focus on the entire screen of the display screen of the display unit 84.

When the user performs a swiping operation on the touch pad 22 from the left to the right at present, the focus is moved to the item $I_n$ located on the right side of the item $I_1$ according to the movement distance of the swiping operation in FIG. 9A and the setting screen which is the item $I_n$ of a movement destination of the focus is assumed to be displayed on the entire screen of the display screen. In this case, when the user performs a swiping operation so that the movement distance exceeds the distance threshold value a plurality of times, the focus flies over the setting screen of the subsequent second step (second page) (moves instantly) and moves to a setting screen (a GUI (item) included in the setting screen) subsequent to the setting screen of the third step.

FIG. 9B illustrates movement of the focus when a swiping operation is performed so that the movement distance exceeds the distance threshold value three times. In FIG. 9B, since the swiping operation is performed so that the movement distance exceeds the distance threshold value three times, the focus moves from the setting screen of the first step (the GUI (item) (display of "YES" in FIGS. 9A and 9B) included in the setting screen) which is the item $I_1$ to the setting screen of the fourth step (the GUI (item) (display of "SET A" in FIGS. 9A and 9B) included in the setting screen) which is the item $I_4$. That is, the display of the entire screen of the display screen transitions at a high speed from the display of the setting screen of the first step to the display of the setting screen of the fourth step just like flying of the display of the setting screens of the second and third steps.

In this case, the setting of the setting screens of the second and third steps ends before the user notices. Thus, the user may not recognize which is set.

Accordingly, in the TV 12, it is possible to limit the movement of the focus according to the item (the setting screen in FIGS. 9A and 9B) including the operation target item (the GUI (item) on which the focus is put), irrespective of the movement speed or the movement distance. That is, in the TV 12, it is possible to limit the movement of the focus to the movement of one frame when the operation target item is, for example, an item for which the entire screen of the display screen is switched, as in the setting screen of the setting application of the wizard mode.

Figure 10A:
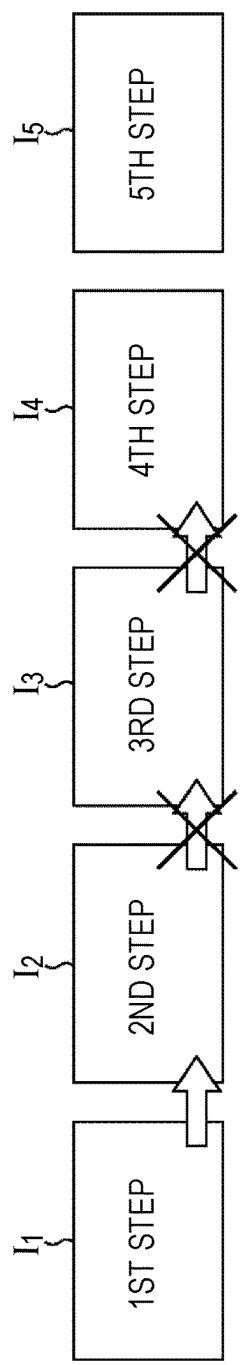
FIGS. 10A and 10B are diagrams for describing the example of the limit of the movement of the focus according to the operation target item.
Figure 10B:
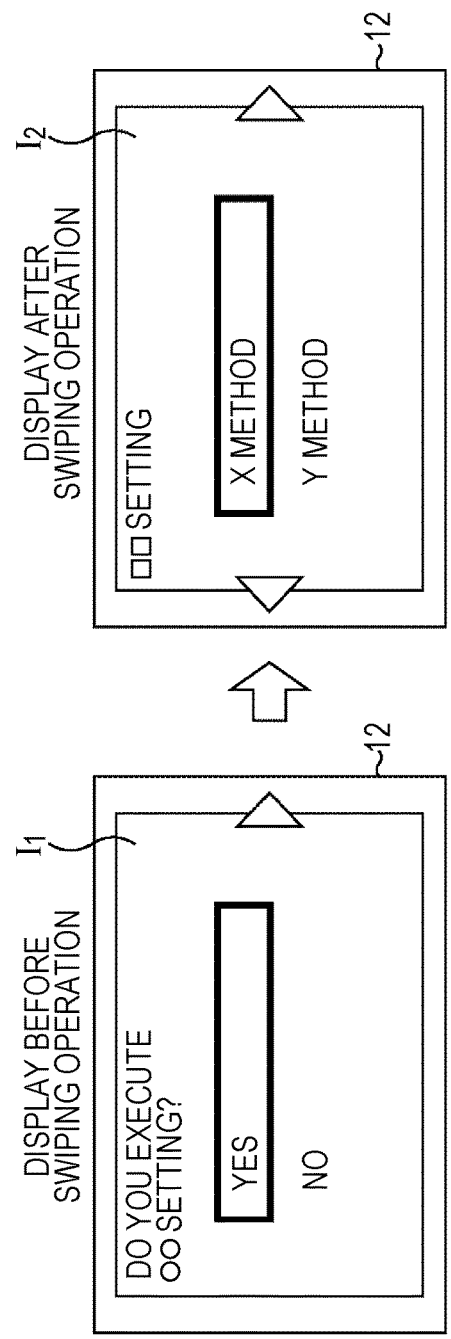

FIGS. 10A and 10B illustrate limit of the movement of the focus when an operation target item is a setting screen of a setting application in which the entire screen is switched, as described above.

FIG. 10A illustrates the setting screen of the setting application as the item. In FIG. 10A, as in the case of FIG. 9A, the setting application performs necessary setting by displaying setting screens, which are setting screens of five pages for setting five steps and setting screens which are each an item $I_n$, as operation target items $I_1$ to $I_5$ on the entire screen in a wizard mode.

In the TV 12 (see FIG. 4), when the operation target item is the setting screen display on the entire screen, the movement of the focus is limited to the movement of one frame (corresponding to one screen of the setting screen). Therefore, even when the user performs a swiping operation so that the movement distance exceeds the distance threshold value a plurality of times, the setting screen to be displayed on the entire screen transitions by only one screen (the focus moves by only one frame).

FIG. 10B illustrates movement of the focus when the swiping operation so that the movement distance exceeds the distance threshold value the plurality of times. For example, it is assumed that the setting screen is focused as the item $I_1$ at present and the user performs a swiping operation on the touch pad 22 from the left to the right so that the movement distance exceeds the distance threshold value three times. In the case of the setting screen in which the operation target item is display on the entire screen, the determination unit 82 supplies (outputs) a movement command to move the focus by one frame in a movement direction of the swiping operation to the control unit 83, irrespective of the movement speed or the movement distance of the swiping operation, when the movement distance exceeds the distance threshold value once or more times.

The control unit 83 moves the focus by one frame in the movement direction of the swiping operation according to the movement command from the determination unit 82.

Accordingly, for example, when the setting screen (the GUI (item) included in the setting screen) is focused as the item $I_1$ at present and even when the user performs the swiping operation on the touch pad 22 from the left to the right so that the movement distance exceeds the distance threshold value three times, the focus moves by only one frame (corresponding to one screen of the setting screen) to the right from the setting screen (the GUI (item) included in the setting screen) which is the item $I_1$. Consequently, the setting screen which is the item $I_2$ is displayed on the entire screen.

As described above, when the operation target item is the setting screen displayed on the entire screen, the movement of the focus is limited to the movement of one frame, so that it is possible to prevent movement of the focus unintended by the user, e.g., high-speed transition of the display of the entire screen of the display screen from the display of the setting screen of the first step to the display of the setting screen of the fourth step just like flying of the display of the setting screens of the second and third steps according to the swiping operation of the user, as described with reference to FIG. 9B. Thus, it is possible to improve operability of the swiping operation.

Here, when the operation target item for which the movement of the focus is limited is assumed to be a limit item, examples of the limit item include an item displayed on the entire screen of the display screen, such as the above-described setting screen, and an item (an item controlling a device) operated to continuously change a device state of the TV 12 or the like.

As the item display on the entire screen of the display screen, there is a photo, a document, or the like displayed on the entire screen in addition to the above-described setting screens. By limiting the movement of the focus in regard to photos or documents displayed on the entire screen, it is possible to prevent a page of the photo or the document which is focused (displayed on the entire screen) from instantly flying to a page other than a page contiguous to the current page when a swiping operation is performed.

As the item operated to continuously change the device state of the TV 12 or the like, for example, there is a GUI or the like adjusting a reproduction speed of content reproduced in the TV 12. For example, when a reproduction speed (focus) of content is changed (moved) to 1× speed, 1.5× speed, 2× speed, 3× speed, or the like in a GUI adjusting a reproduction speed of content according to how many times the movement distance of a swiping operation exceeds the distance threshold value according to a swiping operation, the movement of the focus is limited, i.e., a count of the number of times the movement distance of the swiping operation exceeds the distance threshold value is limited to once. Thus, when a swiping operation is performed, a reproduction speed of content can be prevented from being considerably changed instantly.

The movement of the focus can be limited in such a manner that, as described above, the determination unit 82 determines a swiping operation (a movement distance, a movement direction, a movement speed, or the like of the swiping operation), and when the movement distance of the swiping operation exceeds the distance threshold value once or more times, the determination unit 82 outputs a movement command to move the focus in the movement direction of the swiping operation by one frame as long as the movement direction of the swiping operation is not changed. Further, the movement of the focus may be limited, for example, by forbidding movement of a focus until end of a swiping operation, i.e., until cancellation of contact with the touch pad 22, when an operation target item is change (the focus is moved) in an application displaying items. That is, the movement of the focus can be limited in such a manner that the determination unit 82 outputs a movement command to move the focus in a movement direction of a swiping operation by the number of frames which is the same as the number of times the movement distance of the swiping operation exceeds the distance threshold value, and the control unit 83 serving as an application displaying items forbids the movement of the focus until end of the swiping operation when the focus moves by one frame.

The limit of the movement of the focus according to an operation target item can be realized only for a swiping operation of a predetermined direction. That is, the movement of a focus can be limited for a swiping operation of one of the horizontal and vertical directions, e.g., the horizontal direction, and the limit of the movement of the focus can be forbidden for a swiping operation of the other vertical direction. Further, the movement of a focus can be limited according to a movement speed of a swiping operation and the limit of the movement of the focus can be cancelled according to a movement distance.

Process of Moving Focus

Figure 11:
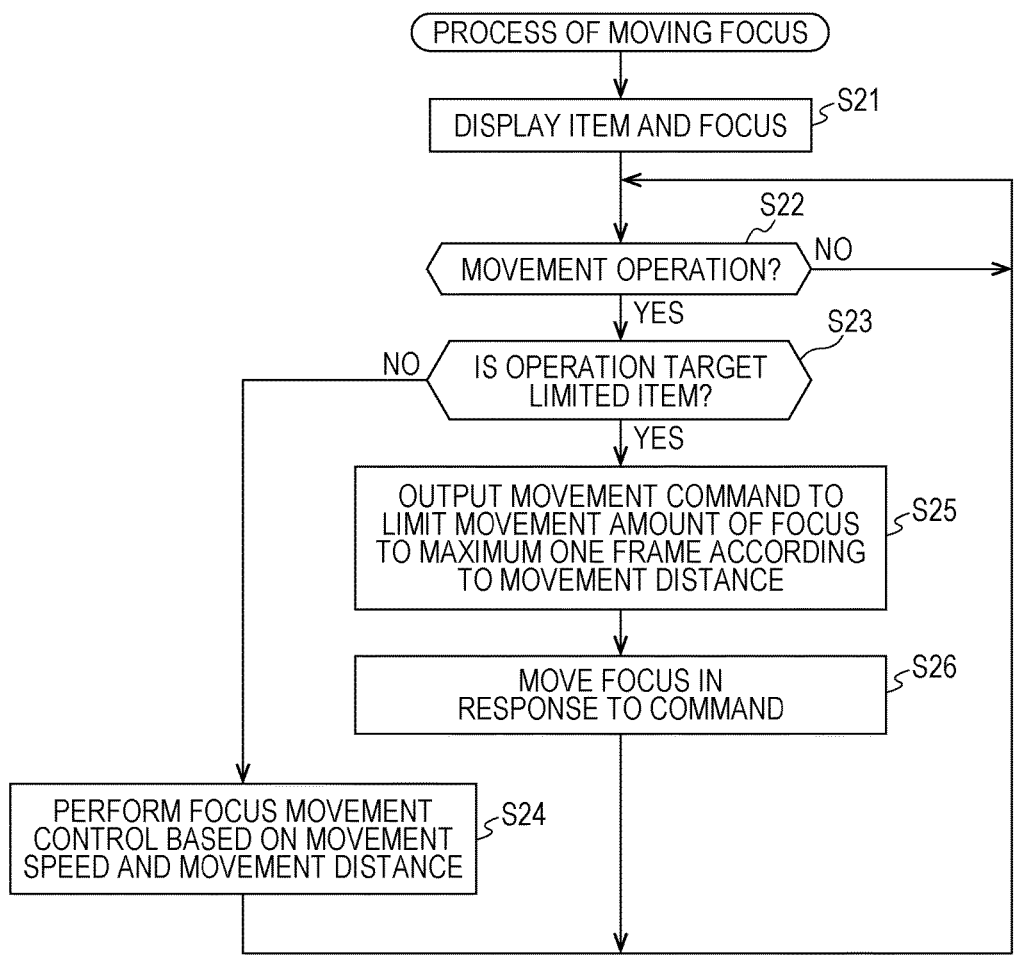
FIG. 11 is a flowchart for describing an example of a process of moving a focus when movement of the focus is limited according to an operation target item.

FIG. 11 is a flowchart for describing an example of a process of moving a focus when movement of the focus is limited according to an operation target item.

In step S21, the control unit 83 displays items and a focus discretely moving on the items on a display screen of the display unit 84. The process proceeds to step S22.

In step S22, based on an operation signal supplied from the remote controller 11 via the communication unit 81, the determination unit 82 determines whether the user performs a swiping operation as a movement operation of moving the focus.

When it is determined in step S22 that the swiping operation is not performed, the process returns to step S22.

Conversely, when it is determined in step S22 that the swiping operation is performed, the process proceeds to step S23. The determination unit 82 determines whether the operation target item is a limit item limiting the movement of the focus.

When it is determined in step S23 that the operation target item is not the limit item, the process proceeds to step S24. As in steps S13 to S17 of FIG. 8, the movement of the focus is controlled based on the movement speed and the movement distance of the swiping operation and the process returns to step S22.

Conversely, when it is determined in step S23 that the operation target item is the limit item, the process proceeds to step S25. As in step S15 of FIG. 8, the determination unit 82 outputs a movement command to limit the maximum movement amount of the focus to one frame according to the movement distance of the swiping operation. The process proceeds to step S26.

In step S26, the control unit 83 moves the focus according to the movement command output by the determination unit 82. The process returns to step S22.

As described above, when the operation target item is the limit item, the movement of the focus is limited to the movement of one frame.

As a result, it is possible to prevent a page of a focused photo or document which is a limit item, e.g., a photo or a document displayed on the entire screen, from flying instantly to a page other than a page contiguous to the current page by a swiping operation. Further, it is possible to prevent a reproduction speed of content from being considerably changed instantly on a limit item, e.g., a GUI adjusting the reproduction speed of the content, by a swiping operation. For example, whether an item is a limit item can be set by the user or can be set in advance in an application that display the item.

In FIG. 11, the determination unit 82 determines whether the operation target item is the limit item. When the operation target item is the limit item, a movement command (hereinafter also referred to as a limit movement command) to limit the maximum movement amount of the focus to one frame is output. When the operation target item is not the limit item, a movement command (hereinafter also referred to as a normal movement command) (see FIG. 8) to move the number of frames corresponding to a movement distance of a movement operation is output. However, whether the operation target item is the limit item can be determined by the control unit 83 serving as an application rather than the determination unit 82.

When the control unit 83 serving as an application determines whether the operation target item is the limit item, the determination unit 82 outputs both of the limit movement command the normal movement command. Then, the control unit 83 serving as an application switches an adopted command between the limit movement command and the normal movement command output by the determination unit 82 according to the operation target item.

Description of Computer to which the Present Technology is Applied

Next, the above-described series of processes can be performed by hardware or can be performed by software. When the series of process is performed by software, a program of the software is installed in a general computer or the like.

Figure 12:
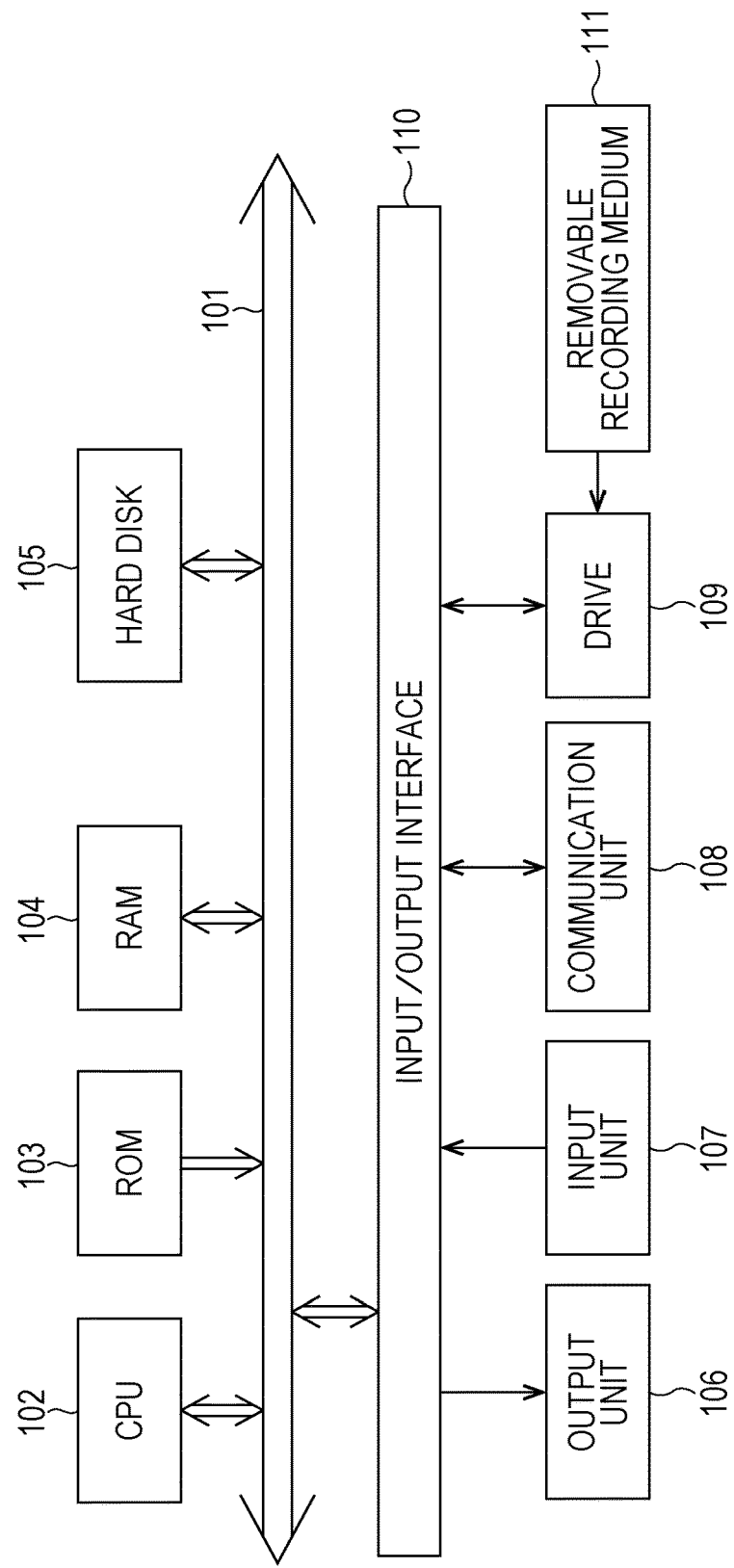
FIG. 12 is a block diagram illustrating an example of the configuration of a computer of an embodiment to which the present technology is applied.

Accordingly, FIG. 12 illustrates an example of the configuration of the computer in which a program executing the above-described series of processes is installed according to an embodiment to which the present technology is applied.

The program can be recorded in advance on a hard disk 105 or a ROM 103 which is a recording medium included in a computer. Alternatively, the program can be stored (recorded) in a removable recording medium 111. The removable recording medium 111 can be supplied as so-called package software. Here, examples of the removable recording medium 111 include a flexible disk, a Compact Disc-Read Only Memory (CD-ROM), a Magneto-Optical (MO) disc, a Digital Versatile Disc (DVD), a magnetic disk, and a semiconductor memory. Not only can the program be installed from the above-described removable recording medium 111 to a computer, but the program can also be downloaded to the computer via a communication network or a broadcast network to be installed in the included hard disk 105. That is, for example, the program can be transmitted from a download site to the computer via an artificial satellite for satellite digital broadcasting in a wireless manner or can be transmitted to the computer via a network such as a local area network (LAN) or the Internet in a wired manner.

The computer includes a central processing unit (CPU) 102. An input/output interface 110 is connected to the CPU 102 via a bus 101. The CPU 102 executes the program stored in a read-only memory (ROM) 103 in response to an instruction when the user operates an input unit 107 to input the instruction via the input/output interface 110. Alternatively, the CPU 102 loads the program stored in the hard disk 105 to a random access memory (RAM) 104 to execute the program. Thus, the CPU 102 executes the processes of the above-described flowcharts or the processes performed by the configuration of the above-described block diagram. For example, the CPU 102 performs output of the process result from an output unit 106, transmission of the process result from a communication unit 108, and recording of the process result on the hard disk 105 via the input/output interface 110, as necessary.

The input unit 107 includes a keyboard, a mouse, and a microphone. The output unit 106 includes a liquid crystal display (LCD) and a speaker. Here, in the present specification, processes executed according to the program by the computer may not necessarily be executed chronologically according to the order described in the flowcharts. That is, the processes executed according to the program by the computer include processes (for example, parallel processes or processes by objects) executed in parallel or individually. The program may be executed by a single computer (processor) or may be distributed and processed by a plurality of computers. The program may be transmitted to a distant computer to be executed.

In the present specification, a system means a set of a plurality of constituent elements (devices, modules (components), and the like), and all of the constituent elements may be present or may not be present in the same casing. Accordingly, a plurality of apparatuses received in separate casings and connected to each other via a network and one apparatus of which a plurality of modules are received in one casing are both a system.

Embodiments of the present technology are not limited to the above-described embodiment, and the present technology can be modified in various ways within the scope of the present technology without departing from the gist of the present technology. For example, the present technology can be realized as a configuration of cloud computing in which one function is distributed to a plurality of apparatuses and is processed in a cooperative manner via a network.

The steps described in the above-described flowcharts can be performed by one apparatus and can also be distributed and performed in a plurality of apparatuses. When a plurality of processes are included in one step, the plurality of processes included in the one step can be performed by one apparatus and can also be distributed and performed in a plurality of apparatuses.

In the embodiments, the remote controller 11 including the touch pad 22 which is a unit operating a focus is adopted. As the unit operating a focus, for example, there can be adopted operation units that include sensors such as a joystick and gyro and acceleration sensors, portable terminals such as wearable terminals capable of performing communication, and other devices such as a device that detects a gesture and moves a focus according to the gesture, a device that detects a line of sight and moves a focus according to the line of sight, and a device that detects a biological signal of a brain wave, a nerve, or the like and moves a focus according to the biological signal.

In the embodiments, the focus displayed by the TV 12 is controlled. However, an embodiment of the present disclosure can be applied, for example, when a focus displayed by an electronic apparatus such as a recorder, a game device, a head-mounted display, other than the TV is controlled.

The remote controller 11 can have some or all of the functions of the determination unit 82 of the TV 12.

An embodiment of the present disclosure can be applied to any of a touch device on which a touch pad is mounted as a touch sensor separate from a display screen on which a focus is displayed and a touch device on which a touch panel is mounted as a touch sensor integrated with a display screen. That is, an embodiment of the present disclosure can be applied to a TV system which is a set of the TV 12 and the remote controller 11 including the touch pad 22 illustrated in FIG. 1, a combination of a note-type PC or a PC on which a touch pad is mounted and an externally attached touch pad, a combination of a monitor, a game device, and a controller on which a touch pad is mounted, a smartphone, a PC, a TV, and other monitors on which a touch panel is mounted, an operation system using a monitor device as a remote input device, and other touch devices.

In the embodiments, the focus is moved in the movement direction of the swiping operation by the number of frames which is the same as the number of times the movement distance of the swiping operation exceeds the distance threshold value. However, one of a fixed value and a variable value can be adopted as the distance threshold value.

In a case in which a variable value is adopted as the distance threshold value, a focus can be moved by one frame for a swiping operation of one time, for example, when a movement distance of the swiping operation exceeds a first distance threshold value th1. When a subsequent movement distance exceeds a second distance threshold value th2, the focus can be moved by one frame. When a further subsequent movement distance exceeds a third threshold value th3, the focus can be moved by the number of frames which is the same as the number of times the movement distance (the movement distance after the movement distance exceeds the second distance threshold value th2) exceeds the third distance threshold value th3.

In this case, for example, by setting the second threshold value th2 to be greater than the first threshold value th1 and setting the third threshold value th3 to be less than the second threshold value th2, it is possible to improve operability in both of a case in which the focus is moved by one frame and a case in which the focus is moved by a plurality of frames.

As described above, when a variable value is adopted as the distance threshold value, a value greater than "th1+th2" can be set as the cancellation threshold value L used in the determination unit 82, so that it is possible to further improve the operability of the focus.

Here, the advantages described in an embodiment of the present disclosure are merely exemplary and not restrictive and other advantages may be obtained. In the present specification, "greater (less) than A" may mean "equal to or greater (equal to or less) than A."

An embodiment of the present technology can be configured as follows:

<1> A control device includes a control unit configured to discretely move a focus on a display screen according to a user's operation. Movement of the focus is limited according to a movement speed of the user's operation.

<2> In the control device described in <1>, the movement of the focus may be limited when the movement speed is faster than a predetermined value.

<3> In the control device described in <1> or <2>, the movement of the focus may be limited to movement of one frame from a currently focused item to an item adjacent to the item.

<4> In the control device described in any one of <1> to <3>, the limit of the movement of the focus may be cancelled according to a movement distance of the user's operation.

<5> In the control device described in <4>, the limit of the movement of the focus may be cancelled when the movement distance is longer than a predetermined value.

<6> In the control device described in any one of <1> to <5>, the movement of the focus may be limited according to an operation target item.

<7> In the control device described in <6>, the movement of the focus may be limited to movement of one frame from a currently focused item to an item adjacent to the item.

<8> The control device described in <7> may further include a determination unit configured to determine the user's operation and output instruction information instructing movement of the focus according to a determination result of the user's operation. The control unit may move the focus according to the instruction information.

<9> In the control device described in <8>, when the determination unit outputs the instruction information instructing the movement of one frame according to the user's operation of moving the focus by one or more frames and the control unit moves the focus according to the instruction information, the movement of the focus may be limited to the movement of one frame.

<10> A control method includes discretely moving a focus on a display screen according to a user's operation. Movement of the focus is limited according to a movement speed of the user's operation.

<11> A program causes a computer to function as a control unit discretely moving a focus on a display screen according to a user's operation. Movement of the focus is limited according to a movement speed of the user's operation.

It should be understood by those skilled in the art that various modifications, combinations, sub-combinations and alterations may occur depending on design requirements and other factors insofar as they are within the scope of the appended claims or the equivalents thereof.

What is claimed is:

1. A control device, comprising:
   a Central Processing Unit (CPU) configured to:
   determine that a movement amount of focus for a plurality of items of an application is limited to one item for each user operation, wherein the plurality of items corresponds to a series of setting screens of the application;
   control, based on the determination, a display device to display a first item of the plurality of items on an entire surface of the display device;
   receive an input signal that corresponds to a user operation;
   output a command based on the determination and the input signal, wherein the command is configured to limit the movement amount of the focus on the display device; and
   control the display device to switch the display of the first item to a second item of the plurality of items, based on the command, wherein
   the second item is displayed on the entire surface of the display device,
   the second item is subsequent to the first item in the series of setting screens of the application, and the second item replaces the first item on the entire surface of the display device based on the switch.

2. The control device according to claim 1,
   wherein the input signal indicates a movement speed of the user operation, and
   wherein the CPU is further configured to switch the focus from the first item to the second item, based on the movement speed of the user operation that is greater than or equal to a speed threshold value.

3. The control device according to claim 1, wherein the CPU is further configured to:
   determine an operation type of the user operation;
   generate instruction information based on the operation type; and
   control the display device to switch the display of the first item to the second item, based on the instruction information.

4. The control device according to claim 3, wherein the CPU is further configured to move the focus by the movement amount of one frame, based on the instruction information.

5. A control method, comprising:
   in a control device:
   determining that a movement amount of focus for a plurality of items of an application is limited to one item for each user operation, wherein the plurality of items corresponds to a series of setting screens of the application;
   controlling, based on the determination, a display device to display a first item of the plurality of items on an entire surface of the display device;

receiving an input signal that corresponds to a user operation;

outputting a command based on the determination and the input signal, wherein the command is configured to limit the movement amount of the focus on the display device; and controlling the display device to switch the display of the first item to a second item of the plurality of items, based on the command, wherein the second item is displayed on the entire surface of the display device, and the second item is subsequent to the first item in the series of setting screens of the application, and the second item replaces the first item on the entire surface of the display device based on the switch.

6. A non-transitory computer-readable medium having stored thereon, computer-executable instructions, which when executed by a computer, cause the computer to execute operations, the operations comprising:

determining that a movement amount of focus for a plurality of items of an application is limited to one item for each user operation, wherein the plurality of items corresponds to a series of setting screens of the application;

controlling, based on the determination, a display device to display a first item of the plurality of items on an entire surface of the display device;

receiving an input signal that corresponds to a user operation;

outputting a command based on the determination and the input signal, wherein the command is configured to limit the movement amount of the focus on the display device; and controlling the display device to switch the display of the first item to a second item of the plurality of items of the application, based on the command, wherein the second item is displayed on the entire surface of the display device, and the second item is subsequent to the first item in the series of setting screens of the application, and the second item replaces the first item on the entire surface of the display device based on the switch.

7. The control device according to claim 1, wherein the command is one of a limit movement command to set the movement amount equal to one frame or a normal movement command to set the movement amount to greater than one frame.

8. The control device according to claim 1, wherein the CPU is further configured to:

determine that the user operation corresponds to a movement distance of two or more items of the plurality of items; and control the display device to limit the movement amount of the focus to one adjacent item of the plurality of items in response to the user operation based on the determination that the user operation corresponds to the movement distance of the two or more items.

* * * * *